(12) United States Patent
Baileys et al.

(10) Patent No.: US 11,187,603 B2
(45) Date of Patent: Nov. 30, 2021

(54) VARIABLE RELUCTANCE MEASUREMENT TECHNOLOGY FOR DRILLING RISERS AND RISER TOWERS

(71) Applicant: OIL STATES INDUSTRIES, INC., Arlington, TX (US)

(72) Inventors: John Ray Baileys, Arlington, TX (US); Michael Eugene Hogan, Arlington, TX (US); Joseph Michael O'Neil, Irving, TX (US); Daniel Joseph Tye, Dallas, TX (US)

(73) Assignee: Oil States Industries, Inc., Arlington, TX (US)

( * ) Notice: Subject to any disclaimer, the term of this patent is extended or adjusted under 35 U.S.C. 154(b) by 80 days.

(21) Appl. No.: 16/435,125

(22) Filed: Jun. 7, 2019

(65) Prior Publication Data

US 2019/0376859 A1  Dec. 12, 2019

Related U.S. Application Data

(60) Provisional application No. 62/683,254, filed on Jun. 11, 2018.

(51) Int. Cl.
*E21B 17/01* (2006.01)
*E21B 17/08* (2006.01)
*G01L 5/102* (2020.01)

(52) U.S. Cl.
CPC .............. *G01L 5/102* (2013.01); *E21B 17/01* (2013.01); *E21B 17/085* (2013.01)

(58) Field of Classification Search
CPC ......... E21B 17/01; E21B 17/085; G01L 5/102
See application file for complete search history.

(56) References Cited

U.S. PATENT DOCUMENTS

| 4,811,597 A | 3/1989 | Hebel |
| 4,825,701 A | 5/1989 | Holtslander |

(Continued)

FOREIGN PATENT DOCUMENTS

| GB | 2541722 | 3/2017 |
| GB | 2547493 | 8/2017 |

(Continued)

OTHER PUBLICATIONS

Patent Cooperation Treaty, International Search Report and Written Opinion—PCT/US2017/066858, dated Feb. 12, 2018.

(Continued)

*Primary Examiner* — Matthew R Buck
(74) *Attorney, Agent, or Firm* — Morgan, Lewis & Bockius LLP (57) ABSTRACT

The invention involves utilizing variable reluctance measurement technology ("VRMT") sensors to monitor forces and stresses on drilling risers and riser towers. The tension monitoring system described herein includes an optimized configuration of variable reluctance measurement technology sensors, wherein the sensors have increased wire turns around each end of their C-cores or alternatively are mounted on mechanical amplifiers or both. An array of optimized variable reluctance measurement technology sensors can be configured at multiple points on a riser system. The VRMT sensors may be integrally attached to the risers or flexible joints for the risers, or may be installed on existing riser or flexible joint systems.

19 Claims, 7 Drawing Sheets

(56) References Cited

U.S. PATENT DOCUMENTS

| | | | |
|---|---|---|---|
| 5,359,902 A | 11/1994 | Barger et al. | |
| 6,190,091 B1 | 2/2001 | Byle | |
| 6,422,089 B1 | 7/2002 | Madden et al. | |
| 6,591,688 B2 | 7/2003 | Wright | |
| 6,748,809 B2* | 6/2004 | Hanna | E21B 19/09 73/779 |
| 6,752,029 B2* | 6/2004 | Madden | G01G 3/12 73/862.69 |
| 6,752,039 B2 | 6/2004 | Kreuzer et al. | |
| 6,880,408 B1* | 4/2005 | Madden | G01L 1/127 73/782 |
| 6,932,542 B2 | 8/2005 | Chianis et al. | |
| 7,063,485 B2 | 6/2006 | Jordan et al. | |
| 7,493,827 B2 | 2/2009 | Madden et al. | |
| 9,638,654 B2* | 5/2017 | Baileys | G01N 27/02 |
| 9,810,613 B2* | 11/2017 | Rezgui | E21B 17/012 |
| 2002/0160667 A1 | 10/2002 | Madden et al. | |
| 2004/0035215 A1 | 2/2004 | Hanna et al. | |
| 2004/0154390 A1 | 8/2004 | Baustad | |
| 2005/0028606 A1 | 2/2005 | Madden et al. | |
| 2005/0028607 A1 | 2/2005 | Hanna et al. | |
| 2006/0021445 A1 | 2/2006 | Hanna et al. | |
| 2006/0177276 A1 | 8/2006 | Stassen et al. | |
| 2008/0303382 A1* | 12/2008 | Edwards, Jr. | G01L 5/102 310/328 |
| 2010/0162491 A1 | 7/2010 | Souter et al. | |
| 2011/0259115 A1* | 10/2011 | Roberts | G01M 5/0041 73/800 |
| 2012/0132467 A1 | 5/2012 | Zeineddine | |
| 2013/0269946 A1 | 10/2013 | Dziekonski | |
| 2015/0145533 A1 | 5/2015 | Baileys | |
| 2015/0369037 A1 | 12/2015 | Jones | |
| 2018/0106323 A1* | 4/2018 | Allred | B64C 27/35 |

FOREIGN PATENT DOCUMENTS

| | | |
|---|---|---|
| KR | 2016112502 | 9/2016 |
| KR | 2016113757 | 9/2016 |
| WO | 2003091680 | 11/2003 |
| WO | 2003099424 | 12/2003 |
| WO | 2017141056 | 8/2017 |

OTHER PUBLICATIONS

Patent Cooperation Treaty, International Search Report and Written Opinion—PCT/US18/37407, dated Nov. 5, 2018.
Patent Cooperation Treaty; International Search Report and Written Opinion of the International Searching Authority; PCT/US19/36116; dated Sep. 4, 2019.
Communication of European Search Report and Opinion, Application No. EP 17881274, dated Jun. 19, 2020.

* cited by examiner

VARIABLE RELUCTANCE MEASUREMENT TECHNOLOGY FOR DRILLING RISERS AND RISER TOWERS

FIELD OF THE INVENTION

The invention relates to variable reluctance measurement technology for use with drilling risers and riser towers.

BACKGROUND

For offshore drilling and oil production operations, risers connect floating facilities to the sea floor. Drilling risers connect drilling vessels and rigs to the wellhead at the sea floor and operate as conduits to transfer materials between the sea floor and surface. Riser towers are typically fixed to anchor points on the sea floor and rise vertically to a buoyancy tank.

Risers are subject to stresses from oceanic waves and currents. Over time, as subsea drilling and production operations have progressed into deeper waters, the lengths of risers have increased. This has caused riser assemblies to experience increasingly greater pressures while undergoing increasingly greater tension forces associated with the longer and deeper subsea installations. With longer lengths, the unsupported weight of drilling risers has also increased.

One way this is addressed is with buoyancy modules and advanced riser designs, but structural failure of a drilling riser may result if compressive stresses against the riser exceed the limitations of the riser materials or designs. Another potential failure results from the buckling of the relatively long, thin columns that make up the riser. These factors and others continue to create the need for riser assemblies that can manage these increased forces.

A riser system is thus desired that can monitor forces acting upon a drilling riser over time to allow for appropriate servicing when needed.

SUMMARY OF THE INVENTION

The invention involves utilizing variable reluctance measurement technology ("VRMT") sensors to monitor forces and stresses on drilling risers and riser towers. Due to this configuration, tension, compression, and bending moment can be monitored remotely on risers, and the overall health of the riser can be ascertained over time and in real time. The tension monitoring system described herein includes an optimized configuration of variable reluctance measurement technology sensors, wherein the sensors have increased wire turns around each end of their C-cores, are mounted on mechanical amplifiers, are mounted in load compression cells, or any combination of the above. An array of optimized variable reluctance measurement technology sensors can be configured at multiple points on a riser system. The VRMT sensors may be integrally attached to the risers or flexible joints for the risers, or may be installed on existing riser or flexible joint systems.

BRIEF DESCRIPTION OF THE DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DETAILED DESCRIPTION

Exemplary embodiments are illustrated in referenced figures of the drawings. It is intended that the embodiments and figures disclosed herein are to be considered illustrative rather than restrictive. No limitation on the scope of the technology that follows is to be imputed to the examples shown in the drawings and discussed herein.

Riser-mounted tension monitoring systems using optimized variable reluctance measurement technology ("VRMT") sensors are described herein. Based on the internal properties of a VRMT cell, sensors convert displacements in length to determine the force being applied on the riser. VRMT sensors configured for use in tension monitoring systems are reliable in subsea operations to monitor compression, tension, and bending moment forces that may be applied to drilling risers and riser tower systems.

Several prior art documents disclose VRMT sensor designs, including U.S. Pat. Nos. 7,493,827, 6,752,039, and 6,422,089; and U.S. patent application Ser. No. 10/848,525. Mechanical amplifier systems and methods are disclosed in several prior art documents, including U.S. Pat. No. 6,880,408, U.S. Pat. Appl. Ser. No. 60/375,789, and PCT App. No. PCT/US03/12869. Load monitoring systems and methods have also been disclosed in prior art documents, including U.S. Pat. No. 6,748,809, U.S. patent application Ser. Nos. 10/848,600 and 11/152,303, and PCT App. No. PCT/US03/15974. Older conventional variable reluctance measurement technology sensors have weak displacement sensitivity, and space considerations may be an issue.

Regarding VRMT sensor designs, prior art U.S. Pat. No. 7,493,827, which is incorporated herein by reference in its entirety, describes a VRMT sensor as a sensor that uses opposing magnetic cores contained in a support tube. Each of the magnetic cores is attached to opposing ends of the support tube. Thus, as the support tube expands along the tube axis, the ends of the support tube, which are perpendicular to the tube axis, separate. A magnetic circuit is formed having an inductance defined by the size of the gap between the magnetic cores. Accordingly, when the magnetic cores attached to the tube ends separate, the size of the gap between the magnetic cores is increased. Thus, when the inductance is altered, the amount of expansion that has occurred can be determined. Knowing the elastic characteristics of the support tube material, the amount of force applied to the support tube can be calculated. Similarly, contraction of the support tube results in a change in inductance that is indicative of the amount of stress reduction. Alternatively, the support tube can have very little stiffness relative to the structure that it is mounted on so that no load passes through the support tube and it merely displaces the same amount as the structure displaces in the region between the attachment points. The combination is tested under known loads to provide the calibration.

U.S. Pat. No. 7,493,827 further states that one of the magnetic cores is generally preferred to be configured in a C-shape, and attached to an end plate by way of a bracket. The end plate may be one of the tube ends, or another plate that is in turn attached to the support tube. The C-shape is preferred for one of the magnetic cores so that the windings can be placed at the ends of the C-shaped cores. The other magnetic core is preferably I-shaped, and is attached to a second end plate by way of a second bracket. The second end plate, like the first end plate, may be the other tube end, or another plate that is in turn attached to the support tube. Thus, a cavity within the support tube containing the sensor is formed. Preferably, the cavity containing the sensor is sealed in a manner to prevent water or other damaging agents from entering the cavity and damaging the sensor or its wiring. The cavity can also be filled with a low durometer elastomeric potting material, silicon oil, or any other suitable material for protection of the components from environmental agents such as water. The choice of the elastomeric potting material can be selected according to the anticipated environmental exposure of the sensor. For example, in certain applications, a low out-gassing material may be appropriate if the sensor is used at high altitude or space while a low compression material may be better if the sensor is used below sea level, such as underwater or underground.

Further describing VRMT sensors, U.S. Pat. No. 7,493,827 explains that an excitation coil is wound around the poles on one of the magnetic cores, and provides electrical connection for an inductance whose value is variable as a function of the widths of the gaps, and also the axial distortion of the support tube. In the preferred embodiment, there are two excitation coils, each surrounding a separate end of the C-shaped core. This arrangement minimizes non-linearity of response due to fringing effects. The wires from the two coils are twisted and attached to cabling that connects them to external circuitry. Thus, when excited by an external AC voltage, the C-core, the I-core and the gap between the C and I cores form an element of a magnetic circuit. The reluctance of this element is dominated by the gap because the C and I cores are fabricated from high permeability magnetic materials having very little reluctance. The sensor inductance is coupled with a fixed, predetermined capacitance in a resonant inductance-capacitance (LC) circuit. The resonant frequency of the LC circuit is a function of the gap between the C-shaped and I-shaped cores. Accordingly, changes in the gap dimension results in a change in oscillation frequency. Since the only changeable component in the sensor is the number of excitation coils, the sensor is immune to drift.

Finally, as describing VRMT sensor use in an in-line sensor configuration, U.S. Pat. No. 7,493,827 states that, to measure the load on a static device, for example, a chain that moors a marine platform, the support tube is fixedly attached to the surface of a sensor link, and the sensor link placed as a link in the chain. The support tube can be attached to the surface of the sensor link using bolts, by welding, or any other suitable attaching means. In order for the sensor to measure the load on the sensor link, it is preferred that the sensor tube material and the sensor link material are compatible, more preferably the same material or material having the same or similar coefficient of thermal expansion. In the preferred embodiment, the support tube and the sensor link are made of steel. When used in marine applications, it is preferred that a protective coating is applied to the support tube and the sensor link.

Mechanical amplifiers have also seen use in conjunction with VRMT sensors, with one such amplifier configuration being described in prior art U.S. Pat. No. 6,880,408 ("the '408 patent"), which is incorporated herein by reference in its entirety. Such an amplifier is described to generally amplify a given load by multiplying the displacement by the stiffness of the load carrying member in order to obtain a reliable displacement measurement. The precision of the measurement as a percentage of full scale load is determined by the ratio of the smallest displacement that the device can resolve to the displacement under full load. In the '408 patent, an embodiment of mechanical amplifiers is described as comprising first and second amplifier mounting pads, at least one of the first and second amplifier mounting pads connecting to a load carrying member, the first and second sensor mounting pads connected to the first and second amplifier mounting pads via flexible connecting members; and a sensor connected to the first and second sensor mounting pads.

Co-pending and co-owned U.S. patent application Ser. No. 15/839,436 describes a redesign of prior variable reluctance measurement technology sensors to allow them to replace the conventional "load cell" style sensors. In an embodiment, a porch-mount optimized VRMT sensor can be configured with increased wire turns at each end of the C-core. In an embodiment, a porch-mount optimized VRMT sensor can be configured with mechanical amplifiers. In another embodiment, a porch-mount optimized VRMT sensor can be configured with both increased wire turns at each end of the C-core and with mechanical amplifiers.

Figure 1:
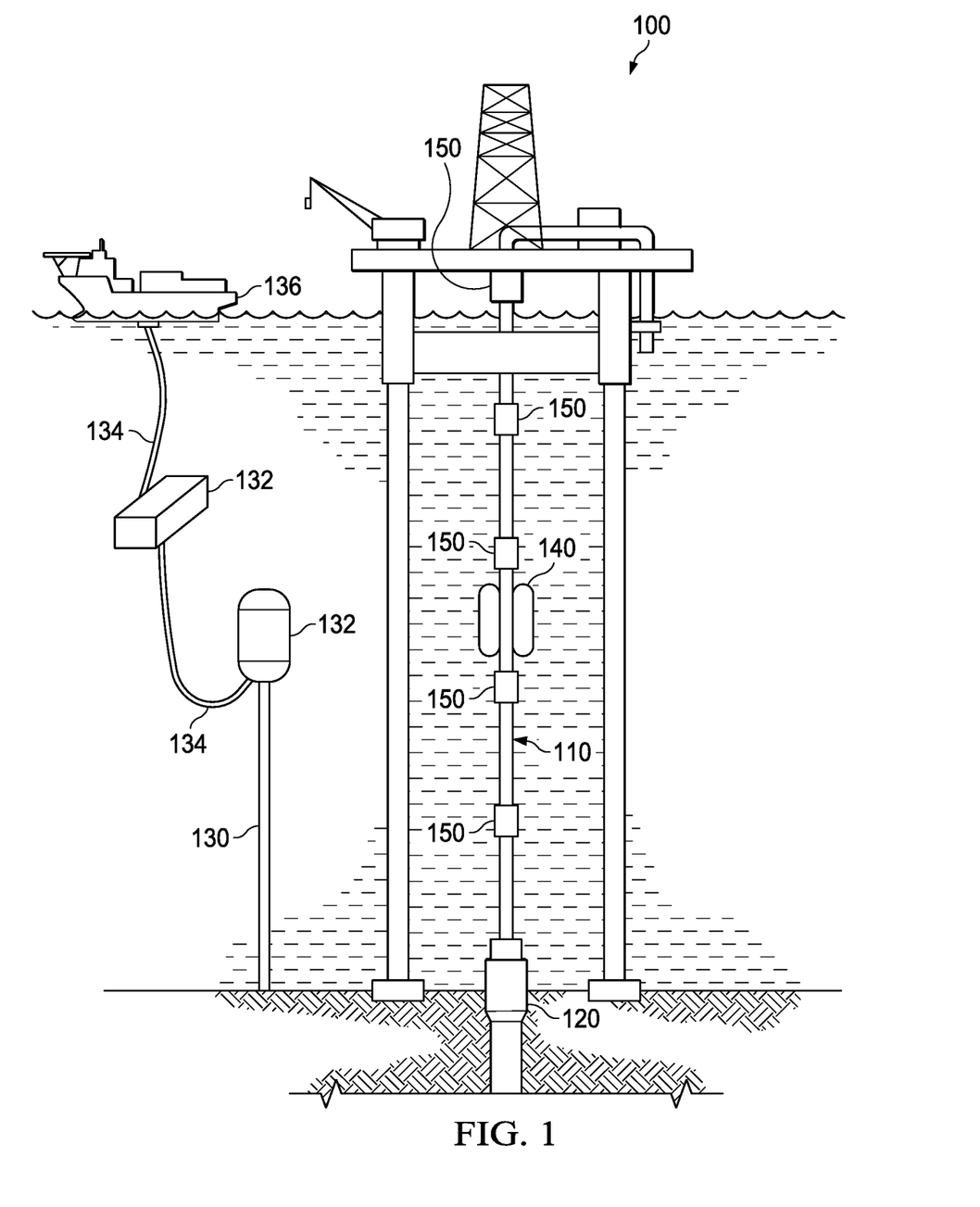
FIG. 1 is a view of a drilling riser and riser tower system as known in the art.

Referring to FIG. 1, a typical drilling rig configuration as known in the art is shown. The drilling rig 100 is located at the surface of the sea, while a drilling riser 110 extends from the wellhead 120 at the sea floor to the drilling rig. The drilling riser 110 may have one or more flexible joints 150 that are placed within the riser string. The flexible joints 150 connect rigid sections of riser pipe and allow flexible and durable connections in the riser string. A drilling riser 110 may typically use three or more flexible joints 150 at different locations along the riser: a subsea flexible joint at the wellhead above the blowout preventer, one or more intermediate flexible joints in the middle of the riser, and a diverter flexible joint near the connection to the drilling rig 100. The drilling riser 110 may also be configured with one or more buoyancy modules 140 that help support the weight of the drilling riser 110.

FIG. 1 also illustrates riser towers 130 anchored to the seafloor and connected to a buoyancy tank 132. Flexible risers, or jumpers, 134 may be used to connect the riser towers 130 to floating vessels 136 or other facilities.

Figure 2A:
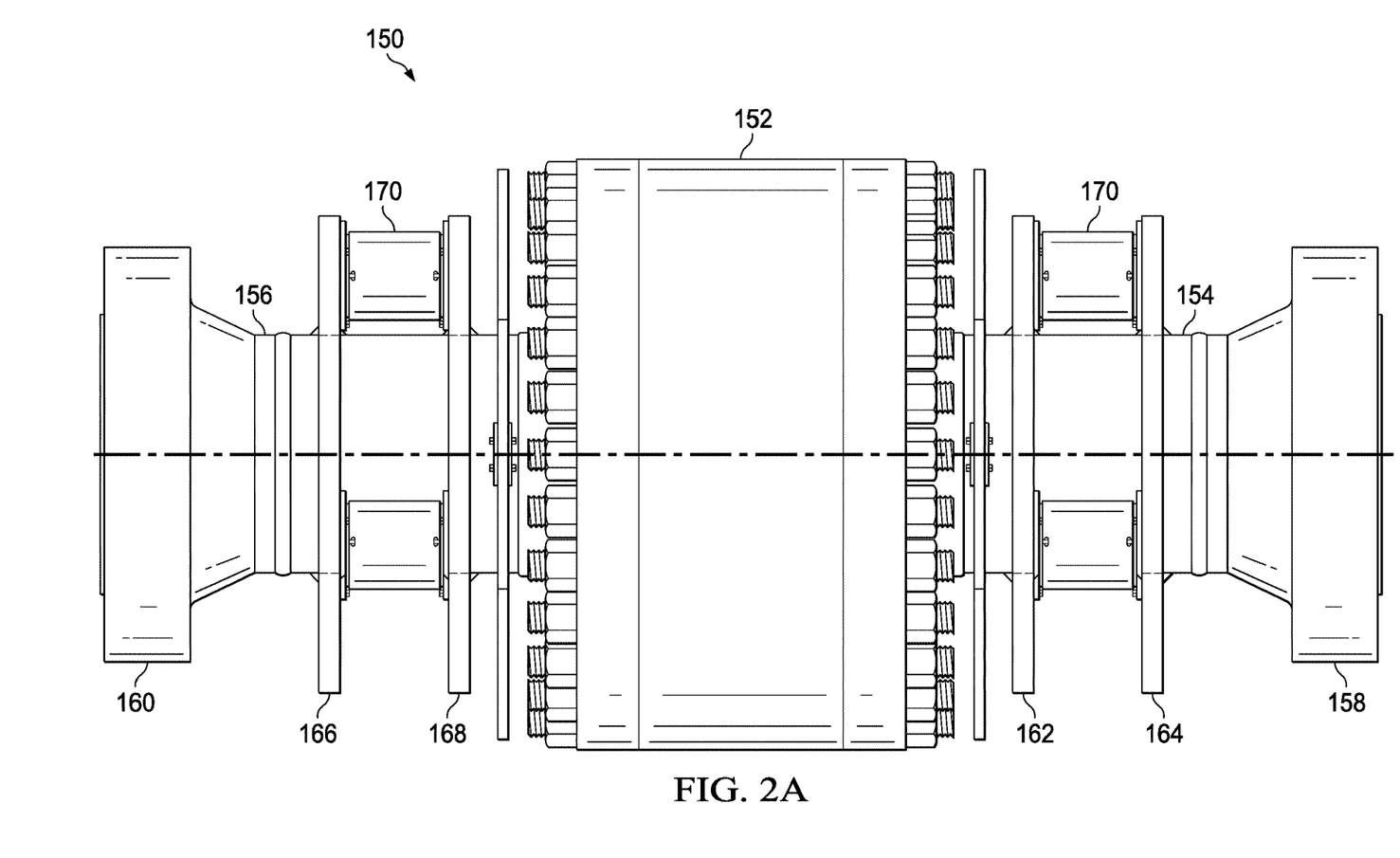
FIGS. 2A and 2B illustrate two embodiments of a flexible joint with a VRMT array that may be used in a drilling riser.
Figure 2B:
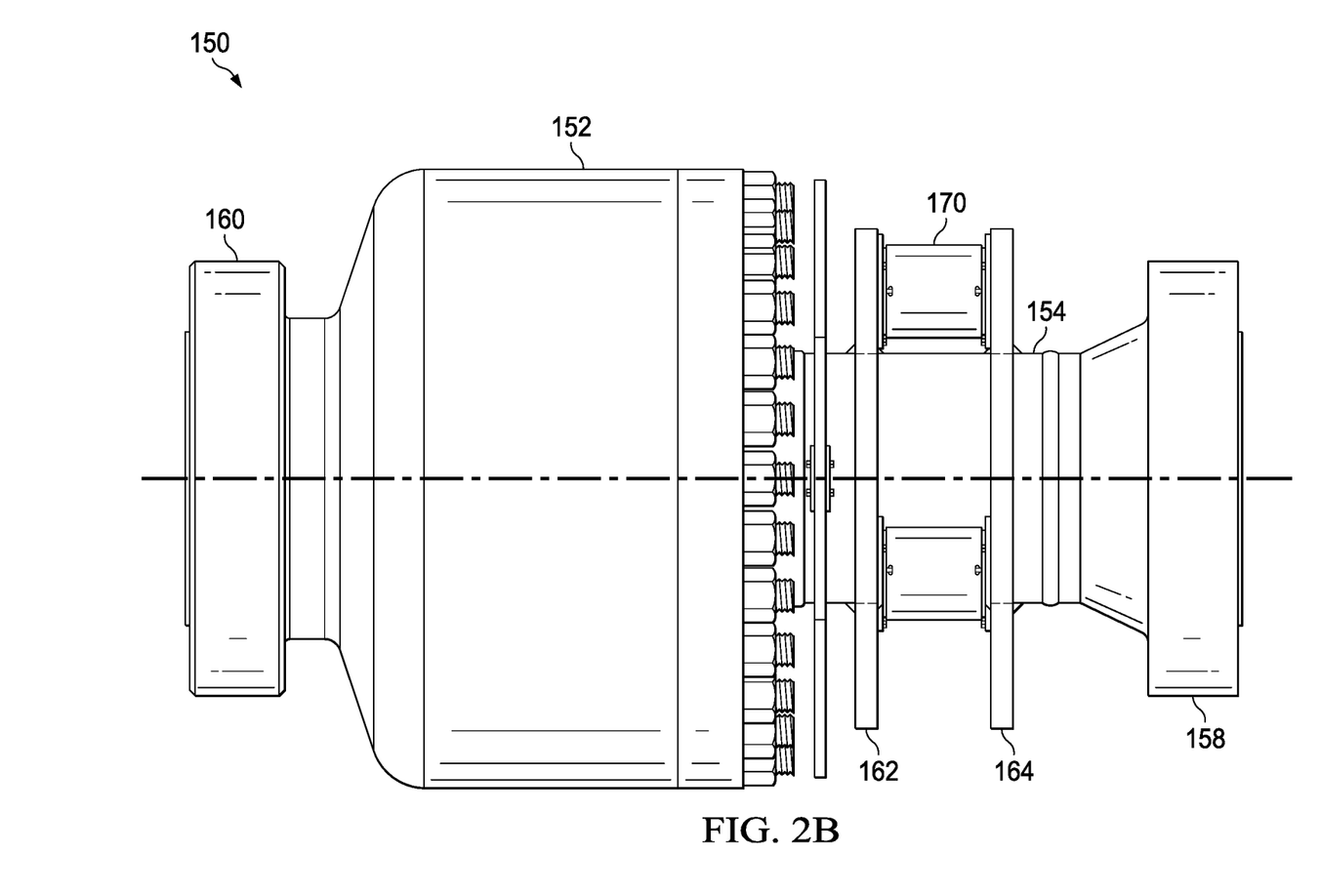

FIGS. 2A and 2B depict two embodiments of a flexible joint 150 that may be used in a drilling riser and as have been modified per this application. Referring to FIG. 2A, the flexible joint 150 may include an outer cylindrical housing 152, upper and lower pipe segments 154 and 156, and upper and lower flanges 158 and 160. FIG. 2B illustrates a flexible joint 150 with a single internal flex element, and FIG. 2A illustrates a flexible joint 150 with two internal flex elements. The internal flex elements allow for flexibility or movement at one or both the upper and lower ends of the flexible joint 150. The flex element(s) for the flexible joint 150 are located internal to the outer cylindrical housing 152 and are not separately shown in the figures.

FIG. 2B illustrates an array of optimized VRMT sensors 170 arranged about the circumference of the pipe segment 154, between VRMT mounting plates 162 and 164. The array will typically include between 3 and 12 VRMT sensors that are spaced about the circumference of a pipe segment. The optimized VRMT sensors operate by measuring the gap between the plates 162 and 164. The system can then use this measurement to calculate and report riser tension based on the changes in the gap. The gap will reduce as compressive load is increased and the gap will increase as tension load is increased. The VRMT sensors are placed such that they are outside of the load path, and this placement increases the reliability of the system and enables maintenance of the VRMT sensors while the system is in use. FIG. 2A is similar to FIG. 2B, and illustrates a second array of VRMT sensors 170 and arranged between a second set of VRMT mounting plates 166 and 168.

Figure 3:
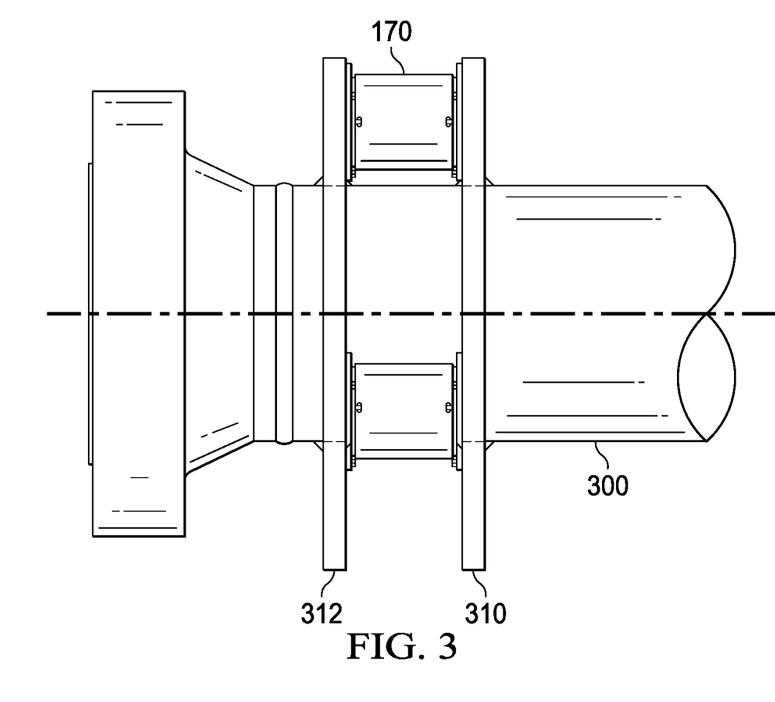
FIG. 3 illustrates an embodiment of a section of drilling riser pipe with a VRMT array.

FIG. 3 illustrates an array of VRMT sensors 170 that may be arranged about the circumference of a riser pipe segment 300 of a riser. The upper and lower mounting plates 310 and 312 on the drilling riser pipe segment may be fit onto existing riser pipe sections by welding the upper and lower mounting plates 310 and 312 onto the pipe and then installing the VRMT sensors between the upper and lower mounting plates 310 and 312. In an embodiment, upper and lower VRMT mounting plates 310 and 312 may be integral to a section of riser pipe, and these riser pipe segments with integral mounting plates and VRMT array may be positioned periodically in the riser string. In an embodiment upper and lower VRMT mounting plates 310 and 312 may be bolted onto the pipe.

Drilling risers are typically in operation for 3-18 months before they are taken to the surface. Riser towers, on the other hand, may be in operation for 20-30 years, as they are anchored to the sea floor. In either application, the upper and lower VRMT mounting plates 310 and 312 may be integral to a segment of riser pipe or riser tower, or attached to an existing segment of riser pipe or riser tower. The array of VRMT sensors can measure the tension, compression, and bending moment applied to a riser or riser tower, and these measurements may be used to monitor the health of the riser system over time. This may include monitoring changes to tension or compression forces or the bending moment, which may occur, for example, through changes to the buoyancy of the riser system over time.

In an embodiment, the VRMT sensor array may include inner and/or outer rubber boots that can be installed to resist ingress of sea water. This boot is put in place to protect the VRMT sensor 170 and may be made from a variety of materials, with rubber being the most typical. The void area that surrounds the VRMT sensors 170 between the rubber boot and upper and lower VRMT mounting plates may be filled with a non-conductive fluid, such as a silicone-based fluid or gel. Other non-aqueous fluids may also be used. The purpose of the non-conductive fluid or gel is to add additional prevention measures against corrosive deterioration by sea water of the VRMT cell materials, sensors, conductive apparatus and fixtures. In an embodiment three VRMT sensors 170 are shown about the circumference of the pipe segment, but more or fewer sensors may be used and the spacing/location of each sensor may vary.

Figure 4:
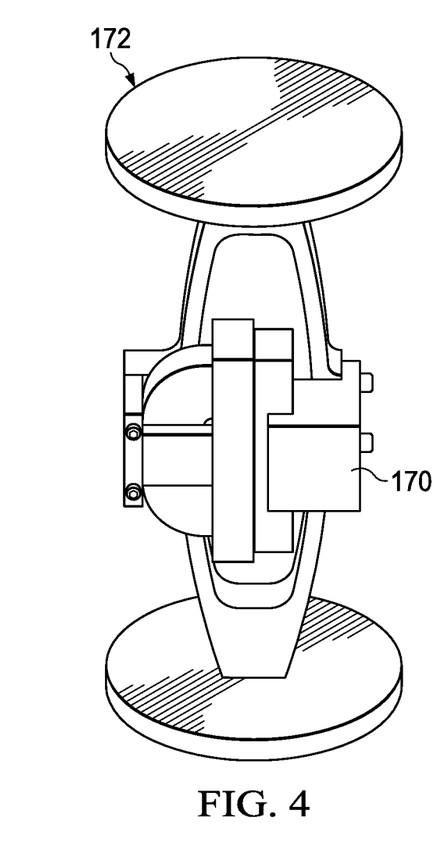
FIG. 4 is a perspective view of an optimized variable reluctance measurement technology sensor configured in a mechanical strain amplifier.
Figure 5:
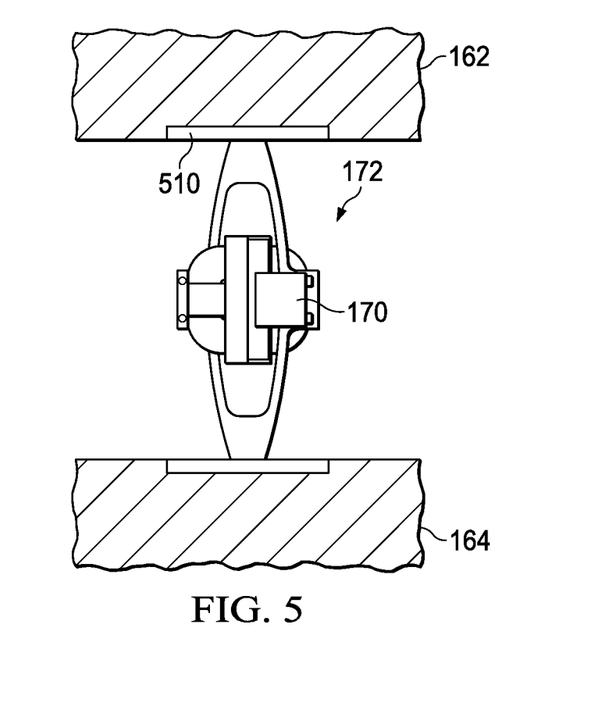
FIG. 5 is an enlarged side cross sectional view of one side of an optimized variable reluctance measurement technology sensor configured in a mechanical strain amplifier.
Figure 6:
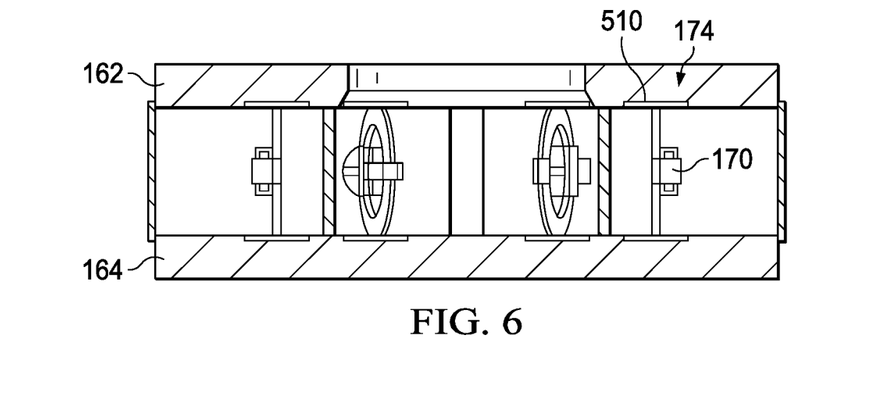
FIG. 6 is an enlarged side cross sectional view of one side of a variable reluctance measurement technology system.
Figure 7:
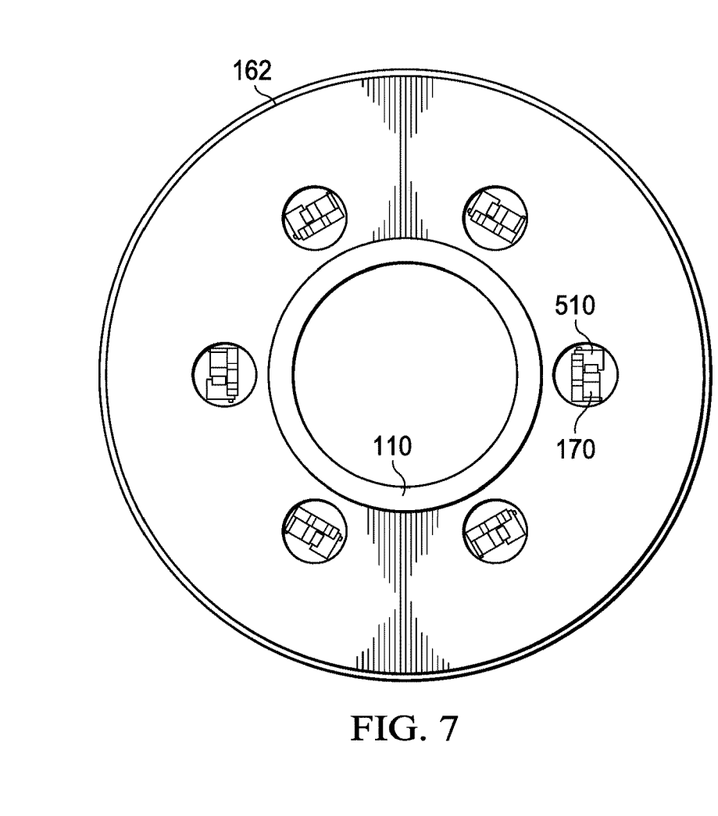
FIG. 7 is an enlarged top view of a tension monitoring system using variable reluctance measurement technology sensor configured in a mechanical strain amplifier.

FIG. 4 shows an optimized VRMT sensor 170 mounted in a mechanical amplifier strain gauge 172. FIG. 5 illustrates an enlarged side view of one of the VRMT sensors 170 mounted in a mechanical amplifier strain gauge 172. In this view, the mechanical amplifier strain gauge mounting slots 510 are shown. These slots 510 can be configured in an embodiment to aid in the serviceability of the VRMT sensors 170. FIG. 6 illustrates a side view of the plurality of optimized VRMT sensors 170 mounted in strain amplifiers 172, and configured between the upper and lower VRMT mounting plates 162 and 164. FIG. 7 similarly illustrates a top view of the configuration of FIG. 6.

In an embodiment of the VRMT array of FIG. 7, each slot 510 that holds the strain amplifier 172 and VRMT sensors 170 can also be positioned towards the outer end of the VRMT mounting plates. This allows for easier access to an individual VRMT sensor 170 for servicing, which may be especially useful in riser tower applications due to the length of their service life.

Figure 8:
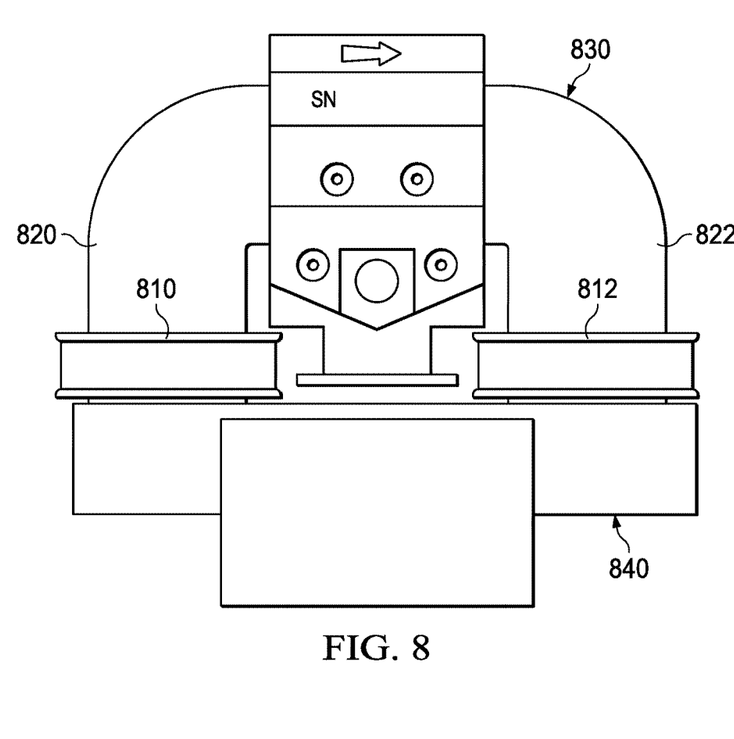
FIG. 8 is a side view of an optimized VRMT sensor.

Referring to FIG. 8, an optimized VRMT sensor design is shown. In this design, the first coil 810 and a second coil 812 are positioned on a first leg 820 and a second leg 822 of each end of the C-core 830. The VRMT sensor I-core 840 is also shown. The I-core 840 of the VRMT sensor, together with the C-core 830, serve as a pair of magnetically permeable core elements. Each are mounted to separate mounting plates such that varying distance between the mounting plates causes the gap between the I-core 840 and the C-core 830 to change. An AC voltage energizing the windings around the ends of the C-core provide an electrical inductance which varies as function of the gap, and thus, also, the displacement between the load plates. The rigidity of the cylindrical compression cell or cells 174 (as shown, for example, in FIG. 6) or mechanical strain amplifiers 172 (as shown, for example, in FIG. 5) can be tuned and/or configured based on the anticipated or designed tensile load point. The optimized VRMT sensor includes an increased number of coil windings in the first coil 810 and the second coil 812 over older VRMT sensors. By increasing the number of windings in each coil, the inductance values are increased and greater measurement sensitivity can be obtained. For example, the prior art coils were configured with 82 turns of 24 AWG wire and in a preferred embodiment the porch-mount optimized VRMT sensor coils can be configured with 164 turns of 24 AWG wire. This example is not intended to be limiting. These optimizations allow the optimized VRMT sensors to be configured in various embodiments as described herein and yield a wider range of displacement measurement for a given VRMT sensor.

Figure 9:
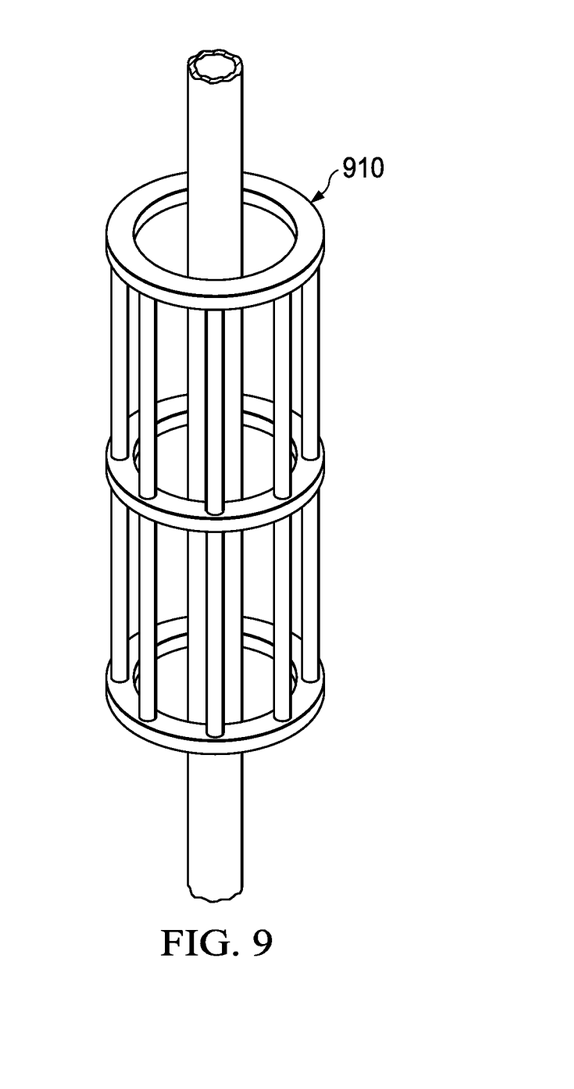
FIG. 9 illustrates a riser segment with a clamp-on module or cage to which the VRMT sensor array may be connected.

In embodiments, rather than being installed integrally with one or more flexible joints, as shown in FIGS. 2A and 2B, the VRMT sensor array may be connected to a clamp-on module or cage 910 (as shown in FIG. 9) that may be installed around a riser segment. Such use of a clamp-on module allows the VRMT sensor array to be attached to an existing riser segment as a retrofit option. The clamp-on module may include upper and lower clamp assemblies with a fixed gap between the assemblies that would house the sensor array. The upper and lower clamp assemblies would preferably include one or more teeth that would bite into the outer pipe of the riser segment, in order to ensure that the VRMT sensor array remains securely attached to the riser segment and is not axially displaced. The clamp assemblies would preferably be formed of a very stiff material, in order to reduce the likelihood that movement of the clamp assemblies themselves, separate from the riser segment to which they are attached, would be recorded by the VRMT sensor array as a load applied to the riser. The clamp-on module could have a hinged configuration, which may also facilitate coupling the module to an existing riser segment. In addition to a riser segment, a clamp-on module could be used to install the VRMT sensor array on a buoyancy module 140 (as shown in FIG. 1).

As an alternative to a clamp-on module, the VRMT sensor array could be installed on a riser segment using bands that circumferentially surround the outer surface of the riser. In such an instance, the I-core 840 and C-core 830 of the VRMT sensors would be mounted to separate bands such that varying distance between the banding (based on compression and tension forces) causes the gap between the I-core 840 and the C-core 830 to change.

In the various described embodiments of the variable reluctance measurement technology arrays, the VRMT sensors are preferably placed in an equiangular configuration. The bending moment on the riser can be calculated based on differences in force measurements in the VRMT array. In some embodiments, the VRMT sensors may not be placed in an equiangular configuration, possibly due to physical constraints on placement. In such situations, correction factors may be applied to the measurements of the VRMT sensors, such that tension, compression, and bending moment may still be appropriately determined.

Regarding the electronic wiring of the riser monitoring system, power and data cables should be run to each optimized VRMT sensor such that readings can be collected and processed by a computing system and then relayed to operations personnel. The computing system will have a power source, a processor for processing data, memory for storing data, and transmission interfaces to receive and transmit data. In an embodiment, power and data cabling from the sensors may be run through rubber grommets (or packing glands) such that the fluidic material in the cavity between the VRMT mounting plates will not escape. The cabling can then extend to a computing system, which may be located at a relay point or at the surface.

This description of one possible embodiment of the cabling configuration is not meant to be limiting, and a variety of cabling configurations could be employed. For example, the sensors could also transmit their measurement data wirelessly and they can either be powered by hard power lines or by a battery system. In a typical configuration, the VRMT sensors and signal conditioning equipment are powered by hard wired power lines and relay data over wired connections. Batteries may be used as a primary or secondary power source for the system. Alternatively, the sensors could be connected to a battery-powered signal conditioning/data acquisition unit equipped with data storage modules that can be retrieved by a diver or remote-operated vehicle (ROV). There are multiple different wiring path configurations that can be utilized as would be understood by a person of ordinary skill in the art.

As mentioned above, a computing system can be used to collect, log, process, analyze, broadcast, and display readings from the optimized VRMT sensors of the system described herein. The system can also be used to determine when sensors may be malfunctioning and providing inaccurate readings. One method for determining if a sensor is providing inaccurate readings is to compare it to the other sensors in the same pack or group of sensors deployed around a riser. If a sensor is reporting values that differ from the other sensors in its pack or grouping, then this may be an indication that the sensor needs replacement.

Although the concepts disclosed herein have been described in connection with the preferred form of practicing them and modifications thereto, those of ordinary skill in the art will understand that many other modifications can be made thereto. Accordingly, it is not intended that the scope of these concepts in any way be limited by the above embodiment descriptions.

The invention claimed is:

1. A tension monitoring apparatus for a riser, wherein:
    the riser includes a flexible joint comprising a housing, upper and lower flanges, and pipe segments disposed between the housing and each of the upper and lower flanges; and
    the tension monitoring apparatus is located on one or both of the pipe segments of the flexible joint and comprises:
        a pair of substantially parallel mounting plates attached to at least one of the pipe segments and separated by an axial distance; and
        a plurality of variable reluctance measurement technology sensors positioned between said mounting plates and configured to measure changes in the axial distance between said mounting plates.

2. The tension monitoring apparatus of claim 1, wherein each of the plurality of variable reluctance measurement technology sensors are mounted in a mechanical strain amplifier between the pair of mounting plates.

3. The tension monitoring apparatus of claim 2, wherein the pair of mounting plates comprise indentations, wherein each mechanical strain amplifier engages at least one indentation.

4. The tension monitoring apparatus of claim 1, wherein each of the plurality of variable reluctance measurement technology sensors are mounted in a compression cell between the pair of mounting plates.

5. The tension monitoring apparatus of claim 1, further comprising a boot, the boot circumscribing the plurality of variable reluctance measurement technology sensors and engaging the outer circumference of the pair of plates.

6. The tension monitoring apparatus of claim 5, wherein the boot comprises rubber.

7. The tension monitoring apparatus of claim 5, wherein the volume encompassed by the pair of mounting plates, the boot, and the riser is filled with a non-conductive fluid.

8. The tension monitoring apparatus of claim 7, wherein the non-conductive fluid is a silicone-based fluid or gel.

9. The tension monitoring apparatus of claim 1, wherein each of the plurality of variable reluctance measurement technology sensors is radially equidistant from a longitudinal central axis of the riser.

10. The tension monitoring apparatus of claim 1, wherein each of the plurality of variable reluctance measurement technology sensors is equiangularly displaced around the pair of mounting plates.

11. The tension monitoring apparatus of claim 1, further comprising a computing system configured to receive and process data, wherein the variable reluctance measurement technology sensors are configured to collect said data reflecting changes in the axial distance between said mounting plates.

12. The tension monitoring apparatus of claim 11, wherein the computing system is communicatively coupled to each of the plurality of variable reluctance measurement technology sensors.

13. The tension monitoring apparatus of claim 12, further comprising power and data cables connected to each of the plurality of variable reluctance measurement technology sensors.

14. The tension monitoring apparatus of claim 12, wherein the computing system comprises a power source, a processor, memory, and transmission interfaces to receive and transmit data.

15. The tension monitoring apparatus of claim 12, wherein the computing system is located proximate to the flexible joint and comprises data storage modules.

16. The tension monitoring apparatus of claim 12, wherein the computing system is located remotely from the flexible joint and comprises cabling configured to transmit data from the plurality of variable reluctance measurement technology sensors.

17. The tension monitoring apparatus of claim 12, wherein the computing system is configured to compare data received from each of the plurality of variable reluctance measurement technology sensors and use such comparison to determine whether one or more of the sensors has malfunctioned.

18. The tension monitoring apparatus of claim 1, wherein the riser comprises a drilling riser.

19. The tension monitoring apparatus of claim 1, wherein the riser comprises a riser tower.

\* \* \* \* \*